United States Patent
Brownstein et al.

(10) Patent No.: US 8,398,752 B2
(45) Date of Patent: Mar. 19, 2013

(54) HIGH EFFICIENCY LOW PRESSURE DROP SYNTHETIC FIBER BASED AIR FILTER MADE COMPLETELY FROM POST CONSUMER WASTE MATERIALS

(76) Inventors: Jerry M. Brownstein, Issaquah, WA (US); Kathy R. Brownstein, Issaquah, WA (US)

( * ) Notice: Subject to any disclaimer, the term of this patent is extended or adjusted under 35 U.S.C. 154(b) by 248 days.

(21) Appl. No.: 12/850,509

(22) Filed: Aug. 4, 2010

(65) Prior Publication Data
US 2011/0030557 A1 Feb. 10, 2011

Related U.S. Application Data

(60) Provisional application No. 61/231,206, filed on Aug. 4, 2009.

(51) Int. Cl.
*B01D 46/00* (2006.01)

(52) U.S. Cl. ............ 95/273; 55/495; 55/527; 55/DIG. 5; 28/107

(58) Field of Classification Search ............ 55/490–528; 95/273–287; 28/103, 107–108, 110–115
See application file for complete search history.

(56) References Cited

U.S. PATENT DOCUMENTS

| | | | |
|---|---|---|---|
| 3,739,913 A | 6/1973 | Bogosian | 210/242 |
| 4,045,833 A | 9/1977 | Mesek et al. | 5/335 |
| 4,070,287 A | 1/1978 | Wiegand et al. | 210/40 |
| 4,184,953 A | 1/1980 | Allinson et al. | 210/82 |
| 4,212,733 A | 7/1980 | Goto et al. | 210/36 |
| 4,228,614 A | 10/1980 | Cardarelli | 43/131 |
| 4,329,226 A | 5/1982 | Thompson | 210/180 |
| 4,374,175 A | 2/1983 | Tanaka | 428/369 |
| 4,493,772 A | 1/1985 | Tanaka | 210/799 |
| 4,707,269 A | 11/1987 | Ohue et al. | 210/651 |
| 4,780,211 A | 10/1988 | Lien | 210/644 |
| 4,859,348 A | 8/1989 | Jusaitis et al. | 210/799 |
| 4,902,433 A | 2/1990 | Graham et al. | 210/791 |
| 4,965,129 A | 10/1990 | Bair et al. | 428/398 |
| 5,080,956 A | 1/1992 | Smith | 428/166 |
| 5,165,821 A | 11/1992 | Fischer et al. | 405/63 |
| 5,304,311 A | 4/1994 | Codiglia | 210/693 |
| 5,308,497 A | 5/1994 | O'Donnell et al. | 210/693 |
| 5,407,575 A | 4/1995 | Vinsonhaler | 210/484 |
| 5,571,604 A | 11/1996 | Sprang et al. | 428/212 |

(Continued)

FOREIGN PATENT DOCUMENTS

| | | |
|---|---|---|
| DE | 3728899 | 8/1990 |
| JP | S63-221187 | 9/1988 |

(Continued)

OTHER PUBLICATIONS n.a., "Complete Textile Glossary" *Celanese Acetate*, 2pp, 2001.

*Primary Examiner* — Duane Smith
*Assistant Examiner* — Thomas McKenzie
(74) *Attorney, Agent, or Firm* — Lee & Hayes, PLLC

(57) ABSTRACT

A non-woven textile based filter media is produced from polyester fiber generated using recycled polyethylene terephthalate (PET) beverage bottles, and that non-woven textile based filter media is used to make an air filter. By controlling the diameters and lengths of the PET derived polyester fibers, a non-woven textile based filter media that exhibits a natural Minimum Efficiency Reporting Value (MERV) of about 8 (without requiring electrostatic treatment) and a pressure drop of 2.9 PSI or less can be achieved. A related exemplary embodiment is an air filter fabricated entirely from recycled materials, including a recycled cardboard frame, the non-woven textile based filter media made from recycled PET derived polyester fibers, and a support structure made of recycled plastic or metal wire.

16 Claims, 4 Drawing Sheets

U.S. PATENT DOCUMENTS

| | | | |
|---|---|---|---|
| 5,630,873 A | 5/1997 | Weiser et al. | 106/417 |
| 5,672,306 A | 9/1997 | Sprang et al. | 261/136 |
| 5,774,406 A | 6/1998 | Kowshik | 365/226 |
| 5,779,392 A | 7/1998 | Mendes | 405/63 |
| 5,855,784 A | 1/1999 | Pike et al. | 210/505 |
| 5,955,196 A * | 9/1999 | Sakellerides | 428/395 |
| 5,993,675 A | 11/1999 | Hagerthy | 210/799 |
| 6,355,171 B1 | 3/2002 | Rose et al. | 210/323.2 |
| 6,451,427 B1 | 9/2002 | Takashima | 428/372 |
| 6,537,446 B1 | 3/2003 | Sanguinetti | 210/163 |
| 7,090,772 B2 | 8/2006 | Pearson et al. | 210/315 |
| 7,153,417 B2 | 12/2006 | Happel | 210/122 |
| 7,201,843 B2 | 4/2007 | Sasaki et al. | 210/164 |
| 7,404,892 B2 | 7/2008 | Shaw et al. | 210/163 |
| 7,452,831 B2 * | 11/2008 | Yamada et al. | 442/239 |
| 2004/0035797 A1 * | 2/2004 | Brownstein et al. | 210/691 |
| 2004/0040902 A1 | 3/2004 | Hill et al. | 210/169 |
| 2006/0054571 A1 | 3/2006 | Lopez | 210/783 |
| 2006/0057379 A1 * | 3/2006 | Inagaki | 428/373 |
| 2006/0172647 A1 * | 8/2006 | Mehta et al. | 442/327 |
| 2006/0272303 A1 * | 12/2006 | Fujiwara et al. | 55/486 |
| 2007/0012610 A1 | 1/2007 | Shaw et al. | 210/209 |
| 2008/0047430 A1 * | 2/2008 | Kobori | 95/283 |
| 2008/0120954 A1 * | 5/2008 | Duello et al. | 55/528 |
| 2008/0202078 A1 * | 8/2008 | Healey et al. | 55/341.1 |
| 2010/0130086 A1 * | 5/2010 | Dorsey et al. | 442/402 |

FOREIGN PATENT DOCUMENTS

| | | |
|---|---|---|
| JP | 02-160917 | 6/1990 |
| JP | 10-311063 | 12/1998 |
| JP | 2003-236320 | 8/2003 |
| KR | 20-0411401 | 3/2006 |
| WO | WO 02/42215 | 5/2002 |

* cited by examiner

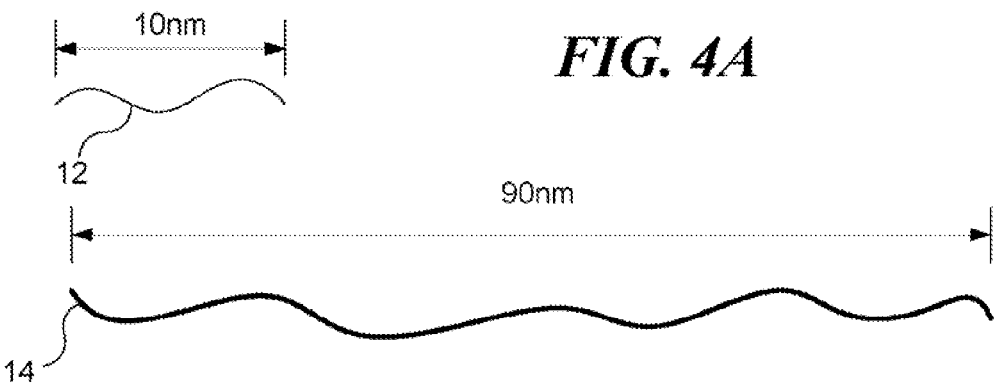
FIG. 4A
FIG. 4B
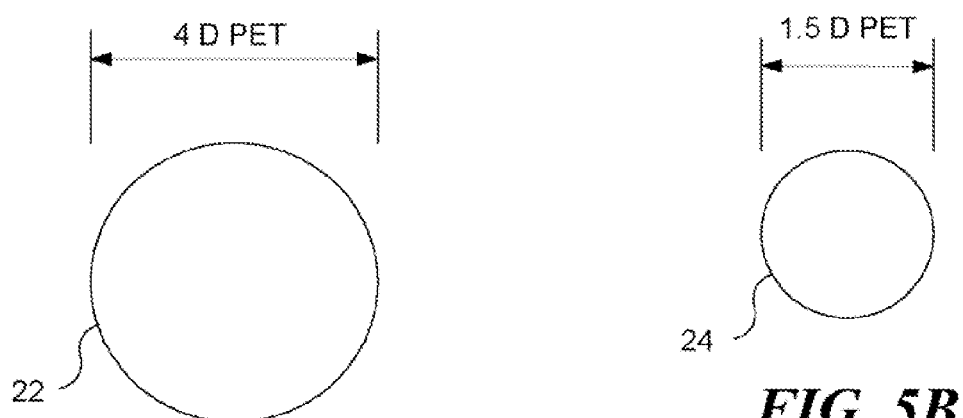
FIG. 5A
FIG. 5B
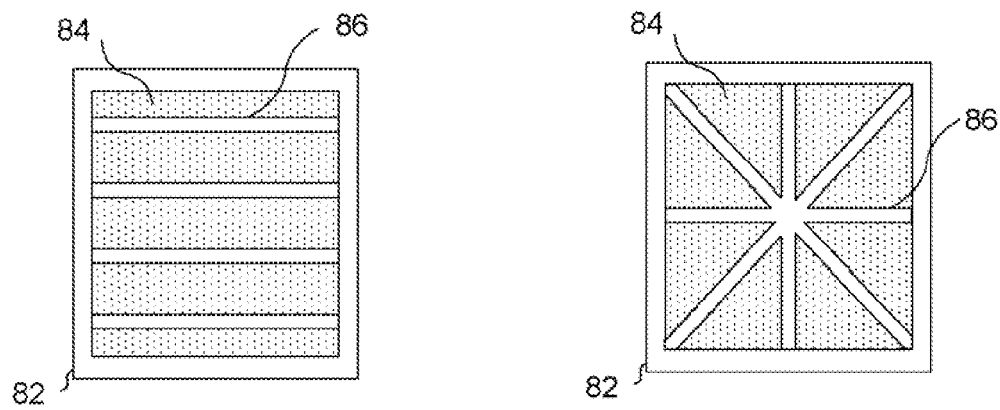
FIG. 8A
FIG. 8B

HIGH EFFICIENCY LOW PRESSURE DROP SYNTHETIC FIBER BASED AIR FILTER MADE COMPLETELY FROM POST CONSUMER WASTE MATERIALS

RELATED APPLICATIONS

This application is based on a prior provisional application, Ser. No. 61/231,206, filed on Aug. 4, 2009, the benefit of the filing date of which is hereby claimed under 35 U.S.C. §119 (e).

BACKGROUND

Air filters are often rated using a Minimum Efficiency Reporting Value (MERV) rating; an industry standardized numerical value used to quantify an air filter's filtering ability. The MERV rating allows consumers to compare the ability of different air filters to capture and hold dirt and dust in specific size ranges. Higher MERV ratings mean fewer dust particles and other airborne contaminants pass through the filter.

Air filters for residential use often have relatively low MERV ratings, ranging from about MERV 1 to about MERV 4. Such air filters are generally incapable of removing particles smaller than about 10 microns. Air filters having a MERV rating ranging from about 5 to about 8 are commonly used as high end residential air filters and for commercial applications, and such air filters will collect particles as small as 3 microns. Air filters having a MERV rating ranging from about 9 to about 12 are commonly used in commercial and industrial applications, and will stop particles in the 1 to 3 micron range. The most efficient air filters have MERV ratings of about 13 to about 16, and such air filters will stop particles as small as 0.3 microns. These air filters are used in hospitals and other super clean environments.

Particularly in commercial heating, ventilation, and air conditioning (HVAC) applications, the amount of energy required to move air through all of the air filters in a system can be significant. Even where two air filters have the same MERV rating, those two air filters may require different amounts of energy to force air through each of the two different air filters. The relative air resistance of an air filter can be measured by determining a pressure drop across the air filter. Air filters having relatively lower pressure drops will require less energy to drive air through the air filter.

While many different types of air filters are known, to date there are no air filters available that combine the characteristics of (1) being made entirely from recycled materials; (2) exhibiting a desirable MERV rating; and (3) exhibiting a relatively low pressure drop. It would be desirable to provide such an air filter.

SUMMARY

This application specifically incorporates by reference the disclosures and drawings of each patent application identified above as a related application.

The concepts disclosed herein encompass air filters that combine the characteristics of (1) being made from recycled materials; (2) exhibiting a desirable MERV rating (in at least one exemplary embodiment, a MERV rating of at least 8); and (3) exhibiting a relatively low pressure drop (in at least one exemplary embodiment, a pressure drop of less than 2.9 PSI). In at least one embodiment, the filter media used in the air filter is made from synthetic fibers generated entirely from post consumer waste materials. While virgin synthetic fibers could be employed to produce the filter media disclosed herein, purchasers of the air filters disclosed herein may prefer "green" (i.e., environmentally friendly) air filters made from recycled materials, over air filters made from virgin materials.

In at least one embodiment, the synthetic fibers are provided in a specific range of lengths, and relatively shorter and relatively longer fibers are combined together into a mass. The mass is then processed into a non-woven textile or fabric, such that the textile or fabric is used as the filter media. Needle-based felting, or needle punching, can be used to generate commercial quantities of a textile having the preferred range of lengths. Such a non-woven textile represents an exemplary textile for implementing the concepts disclosed herein; as such non-woven textiles are much easier to manufacture than woven textiles. With respect to the preferred range of lengths, the longer fibers act as a natural binder to give the resulting textile cohesiveness, while the shorter fibers ensure that the resulting non-woven textile includes a large number of interstitial spaces for capturing contaminants.

With respect to embodiments employing a mixture of different length fibers, empirical testing has determined that fiber lengths ranging from about 5 mm to about 100 mm are most preferred to achieve these enhanced structural properties. A substantial majority of the fibers preferably range from about 5 mm to about 55 mm in length, and most preferably, about 70% of the fibers fall into the aforementioned range of lengths. The length of a minority of the fibers is in the range of from about 60 mm to about 100 mm, and most preferably, less than about 30% of the fibers are in this range. Regardless of the specific range employed, a substantial majority of the fibers must be relatively shorter to provide the desired large surface area, and the desired plurality of interstitial volumes or spaces. Also, regardless of the specific range of lengths of the fibers, sufficient relatively longer fibers are required to enable the wadded mass to achieve a cohesiveness that enables a mat formed out of the wadded mass of fibers to exhibit sufficient structural stability to withstand the air flow rates used in air filtering applications. It should be recognized that while the fiber lengths discussed above represent exemplary lengths used in some embodiments disclosed herein, other embodiments disclosed herein employ different fiber lengths, and some embodiments disclosed herein employ different ratios of fiber lengths.

The ratio of short fibers to long fibers is important in providing a high efficiency filter media. A majority of short fibers increase sorbency by increasing the total surface area of the sorbent and by ensuring that the mass of fibers (in a textile formed from the mixture of fiber lengths) includes a relatively large volume of interstitial spaces for absorption of a material. However, if only short fiber lengths are employed, the resulting mass of short fibers will exhibit very little mechanical strength, such that the mass will be easily broken up and dispersed by even modest air pressure. Thus, a mass of only the short fibers, when formed into a non-woven textile, would not be suitable for use as an air filter, because the mat would disintegrate when exposed to modest air pressure. Industry standard for air filters is based on an air flow rating of about 1968 cubic feet per minute, so filter media used in air filter must at a minimum be able to maintain coherency at such an air flow rate. Industry standard for air filters is based on an air flow rating of about 1968 cubic feet per minute, so filter media used in air filters must at a minimum be able to maintain coherency at such an air flow rate. This is very important, as if an air filter media made out of fibers were to begin to fall apart at such air flow rates, loose fibers could get sucked into the air moving equipment, causing significant damage to expensive mechanical components. Sufficient longer fibers should be included to enable a more structurally stable and stronger network of fibers to be achieved in accord with the concepts disclosed herein, particularly where the mixture of fiber lengths include relatively short fibers (i.e., fibers of less than about 15 mm in length).

In addition to carefully controlling the fiber lengths, fiber diameters are also carefully controlled in at least some embodiments disclosed herein. In at least one embodiment, the fiber diameter used to produce the filter media is 1.5 denier. Denier is a unit of measure for the linear mass density of fibers, defined as the mass in grams per 9,000 meters. A fiber is generally considered a microfiber if it is 1 denier or less. A 1 denier polyester fiber has a diameter of about 10 micrometers. In at least one embodiment, the fiber diameter used to produce the filter media is 4 denier. In a related embodiment, the filter media is made from a mixture of 1.5 denier and 4 denier fibers.

Yet another aspect of the concepts disclosed herein is directed to a method of recycling post consumer waste into a sorbent product. The recycling industry has matured such that plastic beverage bottles represent an ongoing waste stream. Such bottles are often made of polyethylene terephthalate (PET). PET bottles can be converted into polyester fibers of specifically defined diameters, which can be processed into the exemplary lengths discussed above (as well as the lengths discussed below in other embodiments). Once the desired mixture of fiber lengths (and/or diameters) are achieved, the fibers are carded and needle punched to produce a non-woven textile.

In an exemplary air filter embodiment, the filter media (i.e., the non-woven textile) weighs from about 3.5 to about 4.5 ounces per square yard, and can range from about 0.0625 inches in thickness to about 0.180 inches in thickness (when in the form of a non-woven pad or mat). In yet another exemplary air filter embodiment, the filter media (i.e., the non-woven textile) weighs from about 0.15 to about 0.35 ounces per square foot, and can withstand air flow rates of about 1968 CFM or greater.

In a related embodiment, the frame and support structure for the air filters disclosed herein can also be fabricated from recycled materials. The frame can be cardboard that is fabricated from recycled materials, and the support structure can comprise a plastic screen or metal wire mesh (also fabricated from recycled materials). Thus, one aspect of the concepts disclosed herein is directed to an air filter fabricated from 100% recycled materials.

In a related embodiment, in addition to using PET bottles to produce the filter media, fabric and textile waste including a majority of synthetic fibers (including but not limited to clothing, carpet, drapery, linens, tents, and sleeping bags) is shredded to produce synthetic fibers (and in some, but not all exemplary embodiments, such non PET derived fiber is provided in the mixture of relatively long and short fibers discussed above). Where such other waste streams are used to produce recycled synthetic fiber, the non PET derived synthetic fibers should be used in combination with a majority of PET derived polyester fiber. In other words, only relatively smaller amounts of non PET derived recycled synthetic fibers should be used. In an first exemplary embodiment, about 90% or more of the synthetic fiber used in the filter media for the air filter will be PET derived polyester fiber. In a second exemplary embodiment, about 75% or more of the synthetic fiber used in the filter media for the air filter will be PET derived polyester fiber. In a third exemplary embodiment, about 50% or more of the synthetic fiber used in the filter media for the air filter will be PET derived polyester fiber. With respect to synthetic fiber from non PET bottle recycled sources, most of the non PET recycled synthetic fiber will have been delustered (a process that changes the sheen of the synthetic fibers, and which facilitates dying the synthetic fibers). Delustering increases the surface area in the resulting non-woven textile, increasing the effectiveness of the non-woven textile as a filter.

In a related embodiment, an air filter using a recycled synthetic fiber filter media based on one or more of the embodiments discussed above includes a cardboard frame and a mesh support structure, and exhibits a MERV of 8 without any electrostatic treatment (i.e., a natural MERV 8, noting that filter media can be electro-statically charged to temporarily increase the MERV rating of the filter; however, such electrostatic treatments fade over time), and exhibits a pressure drop of less than 2.9 PSI.

In a related embodiment, an air filter using a recycled synthetic filter media as discussed above includes a cardboard frame and a mesh support structure, and the PET derived polyester based filter media has been treated with at least one of a herbicide, a bactericide, a fungicide, an antimicrobial agent, a deodorizer (such as activated carbon, or other materials, to remove odors), and a fragrance (to introduce a pleasant scent into the filtered air).

In a related embodiment, an air filter using the PET derived polyester based filter media discussed above includes a cardboard frame and a mesh support structure, and the PET derived polyester based filter media has been treated with an electrostatic charge to increase its MERV value.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 schematically illustrates an air filter made entirely of recycled materials, incorporating a non-woven textile (made of PET derived polyester fibers having predefined lengths and diameters);

FIG. 2 schematically illustrates an exemplary air filter made entirely of recycled materials, incorporating a pleated non-woven textile;

FIG. 4A is a schematic view of a relatively shorter PET derived polyester fiber that comprises the majority of a non-woven textile filter media in an exemplary embodiment;

FIG. 4B is a schematic view of a relatively longer PET derived polyester fiber that comprises the minority of a non-woven textile filter media in an exemplary embodiment;

FIG. 5A is a schematic view of a relatively wider PET derived polyester fiber that comprises the minority of a non-woven textile filter media in an exemplary embodiment;

FIG. 5B is a schematic view of a relatively thinner PET derived polyester fiber that comprises the majority of a non-woven textile filter media in an exemplary embodiment;

Figure 1:
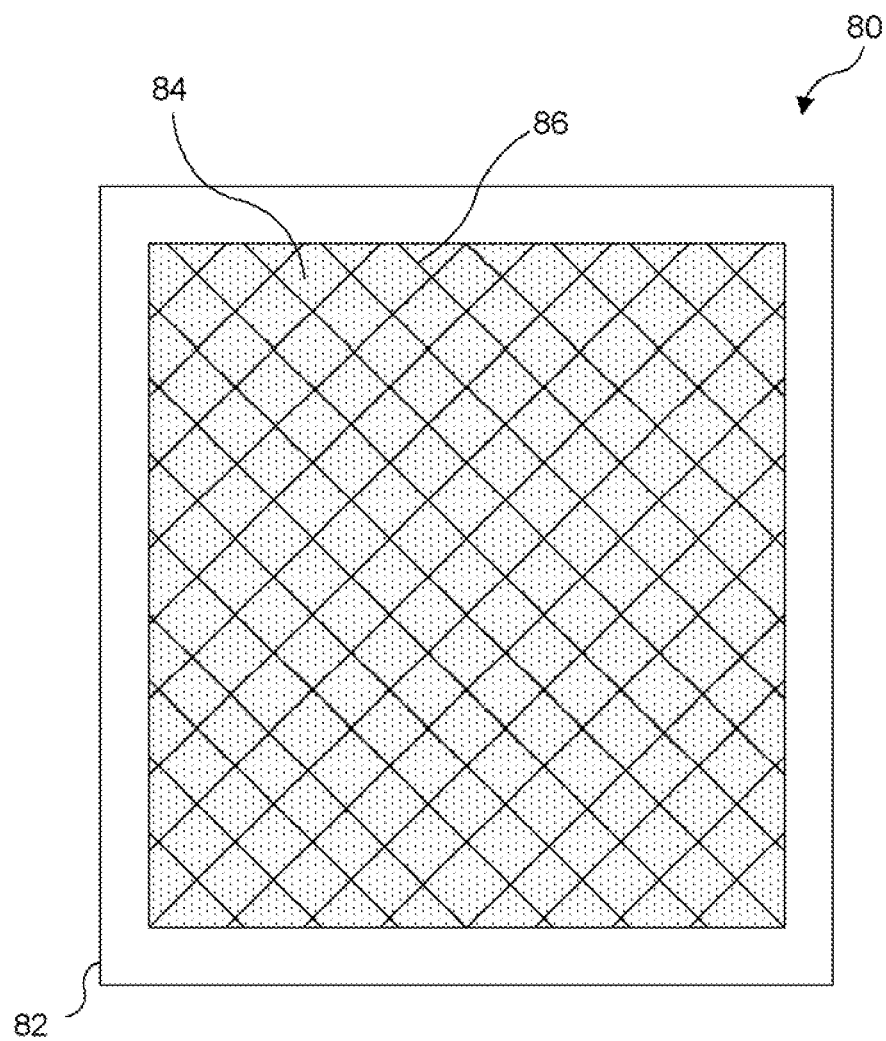
Figure 6:
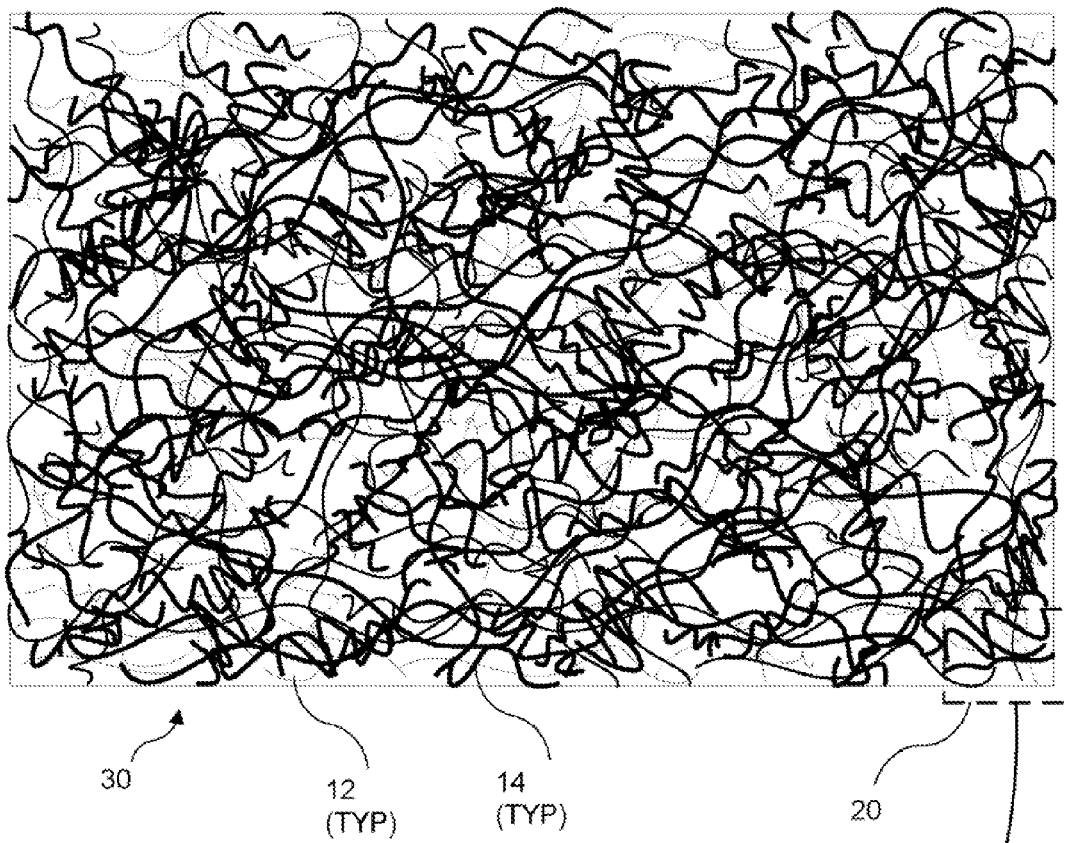
FIG. 6 is a schematic view of a plurality of relatively longer PET derived polyester fibers intermingled with a plurality of relatively shorter PET derived polyester fiber to form a non-woven textile filter media in accord with the concepts disclosed herein.
Figure 7:
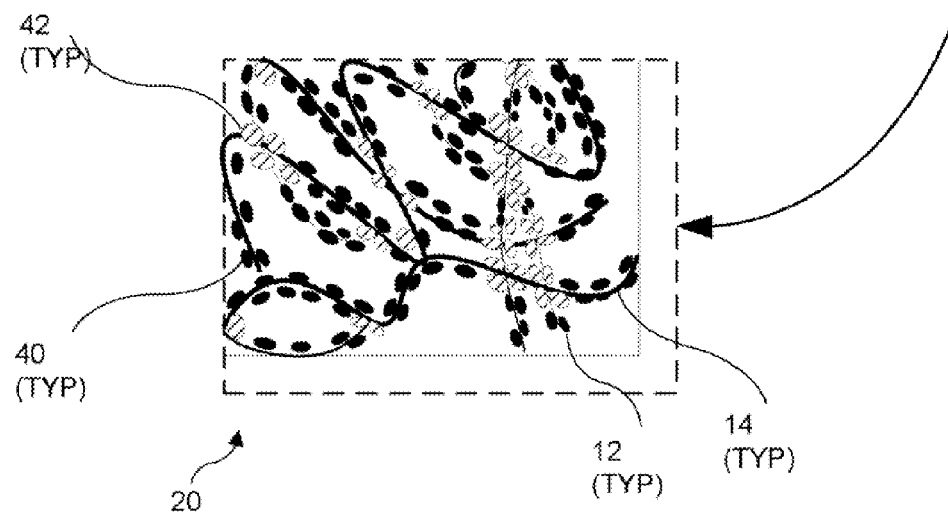

FIG. 7 is an enlarged view of a portion of the schematic view of FIG. 6, illustrating adsorption on the surfaces of both the plurality of relatively longer PET derived polyester fibers and the plurality of relatively shorter PET derived polyester fibers, as well as absorption at a plurality of interstitial spaces within the non-woven textile filter media; and FIGS. 8A and 8B schematically illustrate air filters where the support structure exhibits a different configuration than that shown in FIG. 1.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

As used herein and the claims that follow, the terms about and approximately are intended to refer to a range plus or minus 10% of a stated value. Thus, about 100 and approximately 100 should both be understood to encompass a range of 90 to 110.

Overview of the Concepts Disclosed Herein

An effective air filter, having a desirable MERV rating (in an exemplary embodiment, MERV 8 or above) and a relatively low pressure drop (in an exemplary embodiment, a pressure drop of less than 2.9 PSI) can be made from entirely recycled materials. A key component of such an air filter is a non-woven textile filter media formed out of PET derived polyester fibers. While many different configurations of synthetic fibers can be used to achieve an air filter having a MERV rating of 8 or higher, providing an air filter combining such a MERV rating with a relatively low pressure (i.e., less than 2.9 PSI) is surprisingly difficult. The pressure drop aspect is significant, in that reducing the pressure drop can lead to significant energy savings. For example, a relatively more expensive air filter having a relatively lower pressure drop may actually be more economical to use, once energy costs are factored in. Details of an exemplary non-woven filter media based on PET derived polyester fibers that can be used to achieve an air filter having a relatively low pressure drop are provided below.

Exemplary Air Filters Made Entirely from Recycled Materials

Referring to FIG. 1, an air filter 80 includes a cardboard frame 82, a PET derived polyester fibers based filter media 84, and a support structure 86. The filter media is based on recycled PET derived polyester fibers that have been used to generate a non-woven textile. Exemplary filter media, produced by controlling the source of the fiber, the diameter of the fiber, and the length of the fiber, are discussed in detail below. The selected fibers are formed into a non-woven textile, such as a mat or pad. Needle punching represents an exemplary technique for forming the non-woven textile. Felting or thermal bonding are less preferred, as such techniques generally undesirably increase the pressure drop exhibited in the resulting filter material. The support structure can be a relatively coarse plastic or wire mesh, which is positioned on the air flow exit side of the filter media. Note that relatively coarse meshes are preferred, because relatively tight meshes will undesirably increase the filter's resistance to airflow. In an exemplary embodiment, the frame and support structure can be fabricated from recycled materials. Thus, one aspect of the concepts disclosed herein is an air filter fabricated entirely from recycled materials.

Figure 2:
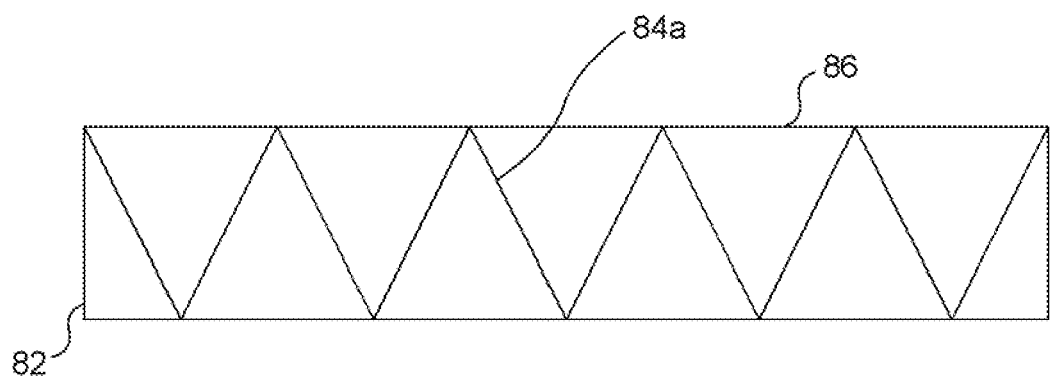

The non-woven textile filter media for the exemplary air filters disclosed herein can be in a flat panel, or a pleated form. FIG. 2 schematically illustrates an exemplary air filter including a cardboard frame 82, in which filter media 84a is arranged in a pleated configuration. Those of ordinary skill will recognize that the number of pleats can be varied in size and density as desired.

Exemplary Filter Media for Use in an Air Filter Having a Low Pressure Drop

Applicants initially attempted to develop an air filter using recycled synthetic delustered fibers generated by reducing textile waste, fabric waste, and clothing waste to fiber form. While that material, marketed under the trade mark X-TEX™, is very effective as a filter media for removing oil from water, when used as an air filter, the pressure drop exhibited by the filter media was higher than desired.

When marketed for use as a filter media for removing oil from water, X-TEX™ is available as a non-woven textile having a density of about 12 ounces per square yard. Air filters using filter media made out of X-TEX™ having that density did exhibit a very satisfactory MERV 8 rating, but also exhibited a pressure drop over 3.8 PSI, indicating that such an air filter would not be very commercially viable due to the availability of lower pressure drop air filters having similar MERV ratings. Reducing the density of the X-TEX™ non-woven textile to about 6 ounces per square yard, and then again to about 4.5 ounces per square yard, resulted in air filters having MERV ratings of about 8, with somewhat lower pressure drops; but the pressure drops for such air filters still exceeded 3.5 PSI. Reducing the density of the X-TEX™ non-woven textile even lower resulted in a filter media that was not sufficiently durable to function as a filter media in an air filter.

Applicants determined that the structure of the non-woven filter media is very important in achieving a relatively low pressure drop. While a non-woven fabric made from a generic synthetic fiber can be used as a filter media for an effective air filter, unless great care is taken in designing the structure of the non-woven fabric, it is difficult to achieve an air filter having a relatively low pressure drop. Extensive empirical testing has indicated that achieving an air filter having a combination of a desirable MERV rating (in an exemplary embodiment, MERV 8 or above) and a relatively low pressure drop (in an exemplary embodiment, a pressure drop of less than 2.9 PSI) requires careful selection of the source of the synthetic fibers used to produce the non-woven fabric filter media, the relative lengths of the synthetic fibers employed in the non-woven fabric filter media, the relative diameters of the synthetic fibers employed in the non-woven fabric, and the relative density of the resulting non-woven fabric filter media. Careful control of such parameters is necessary to achieve the desired combination of MERV rating and pressure drop. Exemplary combinations of these parameters will be provided below, after discussing an exemplary source for recycled synthetic fibers.

Figure 3:
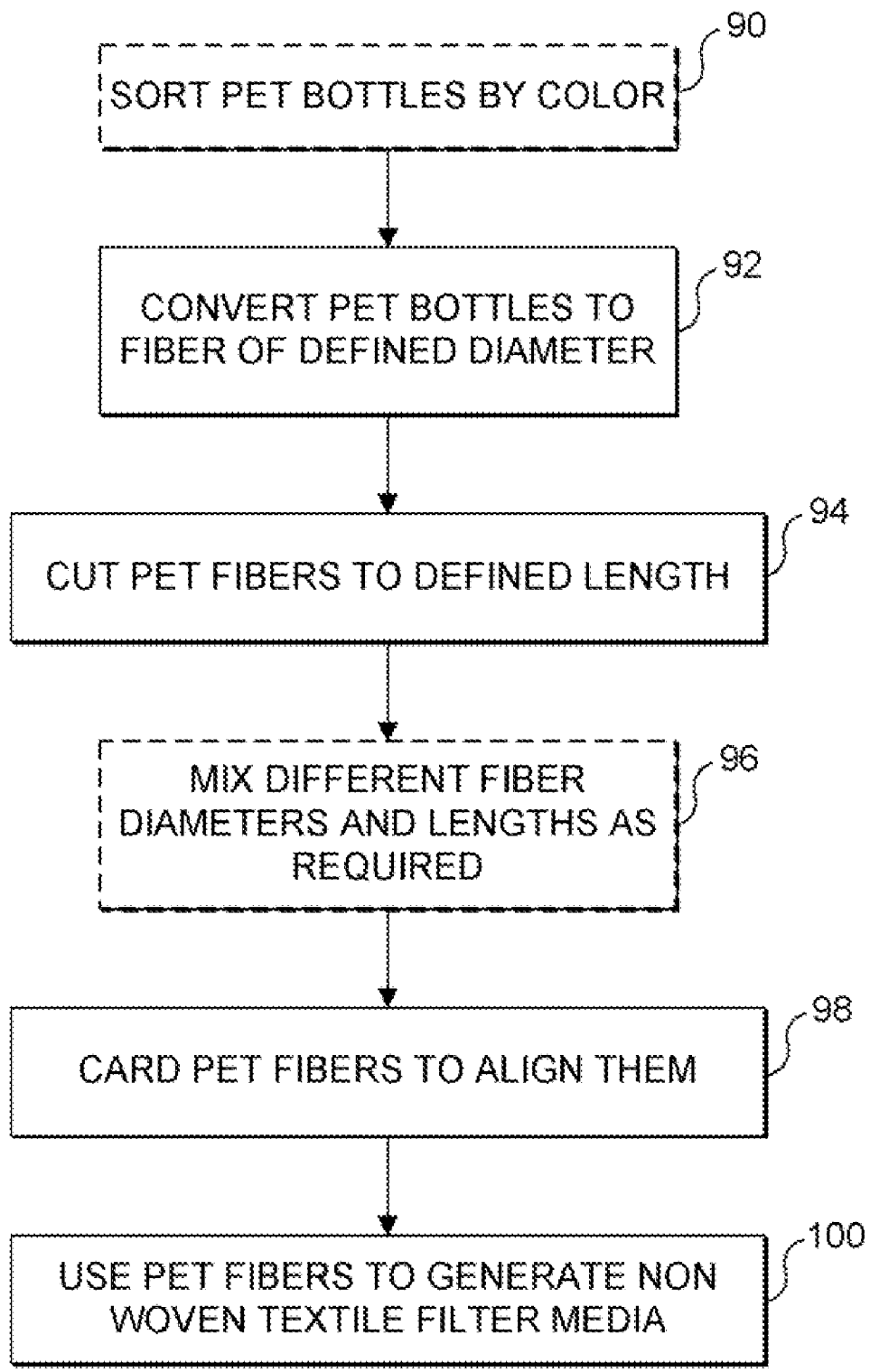
FIG. 3 is a flow chart indicating a sequence of exemplary steps to produce a non-woven textile filter media made of PET derived polyester fibers for use in the exemplary air filters of FIGS. 1 and 2.

Applicants discovered that a recycled synthetic fiber based filter media exhibiting the desired combination of a MERV rating of 8 or higher and a relatively low pressure (i.e., less than 2.9 PSI) can be achieved by using polyester fiber recovered from PET beverage bottles, if the fiber diameter and fiber lengths are controlled as discussed below. FIG. 3 is a flow chart indicating a sequence of exemplary steps to produce a non-woven textile filter media made of PET derived polyester fibers for use in an air filter having a MERV rating of 8 and a pressure drop of less than 2.9 PSI.

In an optional block 90, PET bottles are sorted by color. While the color of the resulting polyester fiber is not important from a performance standpoint, from a marketing standpoint color may be an important parameter to control. For example, end users may falsely consider variations in color to be an indicator of lower quality. Control of the color of the PET bottles used will enable color variations among different batches of PET derived polyester fiber to be reduced. In at least one exemplary embodiment, green PET beverage bottles are employed, so that the resulting PET derived polyester fiber is green in color. From a marketing standpoint, this emphasizes the green (i.e., environmentally friendly) nature of the resulting air filter, because the filter media used in the air filter is literally green in color.

In a block 92, the PET beverage bottles are converted to fiber. Different fiber manufactures may employ different production techniques, thus the following production technique should be considered to be exemplary, and not limiting, so long as the resulting PET derived polyester fibers are of the desired diameter and length. The exemplary fiber production technique is based on pelletizing the PET bottles, melting the pellets to generate molten polyester, and passing the molten polyester through a screen or grating having predefined pore sizes (the pore sizes control the diameter of the resulting individual polyester fibers). In a block 94, the polyester fibers are cut to the desired length. In an optional block 96, different fiber diameters and fiber lengths are combined according to a recipe empirically determined to enable a non-woven filter media having the desired MERV rating and pressure drop to be achieved. As described in detail below, in some embodiments only a single fiber diameter or fiber length is employed, thus the step of block 96 is not required in all embodiments. In a block 98, the polyester fibers are carded (also referred to as combing) to align the individual fibers. The aligned fibers are then used to generate the PET derived polyester fiber based non-woven textile filter media in a block 100. Needle punching represents an exemplary technique to generate the recycled polyester fiber based non-woven textile filter media. In some embodiments, some amount of recycled synthetic fibers from other sources (such as shredded carpet, textiles, and clothing) can be added to the PET derived polyester fiber. However, such other synthetic fiber (generally a mixture of nylon and polyester) will likely not exhibit the closely controlled diameters of the PET derived polyester fiber, and such other synthetic fiber is best used in moderation. The cost of such other synthetic fiber is likely to be lower than the PET derived polyester fiber, but empirical testing has shown that non-woven filter media produced solely from non PET derived polyester cannot achieve a pressure drop of under 2.9 PSI. In an exemplary embodiment, the PET derived polyester fiber is formed into a non-woven textile weighing about 0.15 to about 0.35 ounces per square foot. In at least one exemplary embodiment, the non-woven textile of that weight has a thickness that ranges from about 0.5 cm to about 2.5 cm.

Having generally described the production of a non-woven filter media produced primarily from PET derived polyester fiber, specific fiber recipes (i.e., specific fiber diameters and fiber lengths) for producing a filter media exhibiting a pressure drop of less than 2.9 PSI will now be described.

In a first exemplary fiber recipe, the non-woven filter media is produced from PET derived polyester fiber having the following parameters: about 1.5 denier and about 1.5 inches (about 38 mm) in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a second exemplary fiber recipe, the non-woven filter media is produced from PET derived polyester fiber having the following parameters: about 1.5 denier and about 3 inches (about 76 mm) in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a third exemplary fiber recipe, the non-woven filter media is produced from PET derived polyester fiber having the following parameters: 1.5 denier and fiber lengths ranging from about 5 mm to about 100 mm. A substantial majority of the fibers preferably range from about 5 mm to about 55 mm in length, and most preferably, about 70% of the fibers fall into the aforementioned range of lengths. The length of a minority of the fibers is in the range of from about 60 mm to about 100 mm, and most preferably, less than about 30% of the fibers are in this range. Regardless of the specific range employed, a substantial majority of the fibers must be relatively shorter to provide the desired large surface area, and the desired plurality of interstitial volumes or spaces. Also, regardless of the specific range of lengths of the fibers, sufficient relatively longer fibers are required to enable the resulting non-woven textile to achieve a cohesiveness that enables a mat formed out of the fibers to exhibit sufficient structural stability to withstand the air flow rates used in air filtering applications. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a fourth exemplary fiber recipe, the non-woven filter media is produced from PET derived polyester fiber having the following parameters: about 4 denier and about 1.5 inches (about 38 mm) in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a fifth exemplary fiber recipe, the non-woven filter media is produced from PET derived polyester fiber having the following parameters: about 4 denier and about 3 inches (about 76 mm) in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a sixth exemplary fiber recipe, the non-woven filter media is produced from PET derived polyester fiber having the following parameters: 4 denier and fiber lengths ranging from about 5 mm to about 100 mm. A substantial majority of the fibers preferably range from about 5 mm to about 55 mm in length, and most preferably, about 70% of the fibers fall into the aforementioned range of lengths. The length of a minority of the fibers is in the range of from about 60 mm to about 100 mm, and most preferably, less than about 30% of the fibers are in this range. Regardless of the specific range employed, a substantial majority of the fibers must be relatively shorter to provide the desired large surface area, and the desired plurality of interstitial volumes or spaces. Also, regardless of the specific range of lengths of the fibers, sufficient relatively longer fibers are required to enable the resulting non-woven textile to achieve a cohesiveness that enables a mat formed out of the fibers to exhibit sufficient structural stability to withstand the air flow rates used in air filtering applications. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a seventh exemplary fiber recipe, the non-woven filter media is produced from PET derived polyester fiber having the following parameters: a combination of about 1.5 denier and about 4 denier fibers, and fiber lengths ranging from about 5 mm to about 100 mm. A substantial majority of the fibers preferably range from about 5 mm to about 55 mm in length, and most preferably, about 70% of the fibers fall into the aforementioned range of lengths. The length of a minority of the fibers is in the range of from about 60 mm to about 100 mm, and most preferably, less than about 30% of the fibers are in this range. Regardless of the specific range employed, a substantial majority of the fibers must be relatively shorter to provide the desired large surface area, and the desired plurality of interstitial volumes or spaces. Also, regardless of the specific range of lengths of the fibers, sufficient relatively longer fibers are required to enable the resulting non-woven textile to achieve a cohesiveness that enables a mat formed out of the fibers to exhibit sufficient structural stability to withstand the air flow rates used in air filtering applications. Acceptable ratios of the 1.5 denier and 4 denier fibers respectively include 1:1, 2:1, 3:1, 4:1, 1:2, 1:3, and 1:4 (as well as incremental ratios there between). In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In an eighth exemplary fiber recipe, the non-woven filter media is produced from PET derived polyester fiber having the following parameters: a combination of about 1.5 denier and about 4 denier fibers, and fibers about 3 inches in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

In a ninth exemplary fiber recipe, the non-woven filter media is produced from PET derived polyester fiber having the following parameters: a combination of about 1.5 denier and about 4 denier fibers, and fibers about 1.5 inches in length. In at least one embodiment, such a fiber recipe is formed into a non-woven textile weighing about 0.15 to about 0.35 ounces per square foot. In at least one exemplary embodiment, the non-woven textile of that weight has a thickness that ranges from about 0.5 cm to about 2.5 cm.

With respect to any of the above recipes, other recycled (or virgin) synthetic fibers having relatively larger diameters can be added to the recipe in an amount not to exceed 50% (too much of this larger diameter fiber will reduce the cohesiveness of the resulting filter media). Using about 10% or less of the non PET derived fibers is more preferred.

Applicants previously developed a sorbent material based on textile waste that had been shredded to reduce the waste material into fiber form. The resulting fiber mass included a mixture of delustered nylon and polyester fibers, and was a very effective absorbent material for removing oil from water when processed into a non-woven textile. The nylon fibers averaged about 1.5 denier in diameter, and the polyester fibers averaged about 4.5 denier in diameter. Significantly, the non-woven textile filter media formed from such a fiber mixture was not very successful as an air filter, because while the material had an acceptably high MERV rating of about 8, the pressure drop associated the filter media could not be reduced below about 3.5 PSI (reducing the thickness of the non-woven texture material reduced the pressure drop somewhat, but when the material was made lighter than about 4.5 ounces per square yard, the non-woven fabric disintegrated when exposed to air flow volumes normally used in HVAC applications; i.e., an air flow rate of about 1968 CFM).

Applicants discovered the surprising result that when diameter controlled PET derived polyester fiber was used in place of the highly delustered nylon and polyester fibers discussed above, the resulting non-woven textile could be made significantly lighter than about 4.5 ounces per square yard (as light as about 0.15 to about 0.35 ounces per square foot), without disintegrating when exposed to air flow volumes normally used in HVAC applications. Such a non-woven textile exhibited a MERV rating of about 8, and exhibited a pressure drop below 2.9. Significantly, these superior results were obtained when similar fiber lengths and similar fiber diameters were employed. Note that the recipes noted above are based on PET derived polyester fiber having diameters between 1.5 D and 4 D, yet produced a non-woven textile with startlingly different properties (i.e., the ability to maintain cohesiveness at much lower fiber densities, and a significantly lower pressure drop when used as a filter media for an air filter). The reasons for this surprising result are still being investigated, but it was decidedly unexpected. Initial testing has noted that the PET derived polyester fiber is significantly less delustered than the nylon and polyester fibers derived from recycled textiles where the fibers had been delustered to accept a dye. Delustering has been shown to have a beneficial impact on a fiber's ability to function as a filter media, as such delustering greatly increases the surface area of the fiber. The rough surfaces of the delustered fibers offer greater fiber to fiber fraction between adjacent fibers, which should promote cohesion of a non-woven filter media formed of such fibers. Thus, applicants' discovery that the PET derived polyester fiber, whose individual fibers exhibit significantly less delustering and significantly less surface area, actually enable a more cohesive non-woven textile to be achieved (as compared to non-woven textiles formed from highly delustered nylon and polyester fibers derived from recycled textiles where the fibers had been delustered to accept a dye) is counter-intuitive and quite unexpected. An additional benefit of the use of the PET derived polyester fiber is that such less delustered fibers appear to reduce the air resistance of the non-woven textile based filter media formed out of such fibers, without sacrificing so much absorbent ability to reduce the material's ability to achieve a relatively high MERV rating (i.e., a MERV rating of at least about 8).

FIGS. 4A and 4B illustrate schematic representations of a relatively shorter PET derived polyester fiber 12 and a relatively longer PET derived polyester fiber 14, pluralities of each of which are required in some of the fiber recipes disclosed herein. The exact proportions of the individual fibers are not critical, though in an exemplary embodiment, a majority of the fibers are relatively short, while only a minority of the fibers are relatively long. The relatively shorter PET derived polyester fibers provide a great deal of surface area, while the relatively longer PET derived polyester fibers help bind the relatively shorter fibers and relatively longer fibers together into a mass. In one preferred embodiment, the relatively shorter fibers are on the order of from about 5 mm to about 15 mm in length, while the relatively longer fibers are on the order of from about 85 mm to about 100 mm in length. Such an embodiment also includes a plurality of fibers of intermediate length, ranging from about 15 mm to about 85 mm in length.

FIGS. 5A and 5B illustrate schematic representations of a relatively thick PET derived polyester fiber 22 and a relatively thin PET derived polyester fiber 24. In at least one exemplary embodiment of the concepts disclosed herein, a majority of the fibers are relatively thin, while a minority of the fibers are relatively thick. Using relatively more thinner fibers appears to reduce the pressure drop for the resulting non-woven textile filter media. The relatively thick PET derived polyester fibers are on the order of about 40 μm in diameter (i.e., about 4 D), while the relatively thin fibers are on the order of about 15 μm in diameter (i.e., about 1.5 D). With respect to the length of fibers, in at least one exemplary embodiment, a substantial majority of the PET derived polyester fibers are relatively short, while only a minority of the PET derived polyester fibers are relatively long. In this embodiment, the terms "long" and "short" generally relate to a midpoint in the specific range of lengths of the fibers that are used. Such a mixture of fiber lengths enhances the sorbency of the resulting non-woven textile filter media. With respect to the relative diameters of the individual fibers, the diameters of the individual fibers require significantly more control, and while the diameters do not significantly affect the sorbency of the resulting non-woven fiber material, the diameters do significantly affect the pressure drop of the non-woven textile produced using the PET derived polyester fibers. It should also be noted that fiber length and fiber diameter is a function of processing, in that fibers can be processed to achieve a specific desired range of lengths, and different screens (or sieves, or gratings) can be used to control fiber diameters of the PET derived polyester fibers.

A network 30 of interlinking PET derived polyester fibers in accord with some of the exemplary embodiments disclosed herein is schematically illustrated in FIG. 6. A plurality of relatively shorter PET derived polyester fibers 12 are intermingled with a plurality of relatively longer PET derived polyester fibers 14. As noted above, a minority of relatively longer fibers 14 bind the mass of interleaved fibers (both long and short) together into the desired cohesive mass during needle punching to generate the non-woven textile. FIG. 7 illustrates, in a magnified section 20 of network 30 of interlinking fibers, how network 30 provides a sorbent that exhibits both adsorbent capabilities, as well as absorbent capabilities. Contaminants, such as hydrocarbon products 40 are adsorbed on individual surfaces of both relatively shorter PET derived polyester fibers 12 and relatively longer PET derived polyester fibers 14. Hydrocarbon products 42 are absorbed into interstitial spaces within network 30, proximate to locations where relatively shorter PET derived polyester fibers 12 and relatively longer PET derived polyester fibers 14 cross each other.

Tests of a non-woven textile based on a polyester fiber mixture indicate that when incinerated, the residual ash was less than 1% (~0.6%). The U.S. Environmental Protection Agency has established guidelines for preferred residual ash percentages for sorbent materials, and those guidelines indicate that up to 2% ash is acceptable. From a disposal standpoint, the less ash generated by burning a sorbent material, the better, as the resulting ash must be hauled to a landfill. Without any hydrocarbon having been sorbed, the polyester fiber mixture has a thermal energy rating of about 7,600 British Thermal Units (BTU) per pound. In general, the higher the BUT value of a material, the more likely that material is usable for energy production. The BUT value of coal varies substantially, and ranges from 10,000-15,000 BTU/pound. In addition to the PET derived polyester fiber filter media, the air filters include a cardboard frame, and (in some embodiments) a polymer mesh support member, each of which is suitable for disposal via incineration. Thus, there is potential for disposing of the used air filters by incineration that enables energy recovery. U.S. cement kilns in particular are noted for their use of high BTU value waste materials as supplementary fuels (the production of cement is a very energy intensive process).

As noted above, the PET derived polyester fibers are used to produce a non-woven textile to be used as a filter media (of course, such fibers could be used to generate a woven textile, although the steps required to produce such a woven textile would be cost prohibitive; whereas non-woven textiles can be fabricated at significantly lower costs). One technique for producing a non-woven textile from the mixture of relatively longer and relatively shorter fibers disclosed herein is to provide a "quilted" blanket of the material. A quilted sorbent blanket, as described herein and the claims that follow, is an encapsulating envelope produced in sizes and shapes of conventional sorbent blankets that includes a plurality of individual chambers, each filled with an amorphous mass of PET derived polyester fibers. These individual chambers are defined by a plurality of baffles, or by a plurality of parallel channels. A baffle arrangement segments a quilted sorbent blanket into a plurality of quadrilateral segments joined (or quilted) together to form the blanket. Each baffle is separate from the other baffles, and contains a quantity of PET derived polyester fibers in an amorphous mass configuration. The encapsulating baffle is porous, so air can pass through the baffle and contaminants can be sorbed by the encapsulated mass of PET derived polyester fibers. The purpose of the plurality of baffles is to ensure that the PET derived polyester fiber mass remains evenly distributed throughout the quilted blanket, rather than clumping together at an end of the blanket. A channel configuration works the same way, except the channels are generally elongate in shape, significantly narrower than baffles, and a single channel generally runs the length of the quilted sorbent blanket. In a baffle configuration, a plurality of baffles are required to span the length of the blanket. Such baffles and channels are commonly used in producing down comforters, to ensure that the down in such a comforter remains evenly distributed, and retains a desired loft.

While needle punching represents an exemplary technique for producing the desired non-woven textile filter media from the recycled PET derived polyester fiber, it should be noted that air laid processing can also be employed. In such a process, some binder (such as a thermosetting adhesive) is added to the fibers, as they are air laid into a layered structure. The binder becomes mixed into the fiber mass, and as the binder sets the non-woven textile is generated. The binder somewhat increases the air resistance of the resulting non-woven textile, as well as somewhat reduces the filtering ability of the resulting non-woven textile. However, too little binder will result in the non-woven textile being unable to withstand the required air flow. Thus, the amount of binder being used is balanced between the needs for achieving a filter media with a desired filtering efficiency and a desired cohesiveness.

In a more preferred embodiment of the concepts disclosed herein, the PET derived polyester fibers disclosed herein (i.e., the PET derived polyester fiber recipes noted above) are formed into a non-woven textile. The PET derived polyester fibers disclosed herein can be used to form non-woven pads, filters, mats and blankets in a variety of thicknesses, sizes, and shapes. One technique that is expected to be useful in fabricating such non-woven textiles for use as a filter media is needle punching, or needle weaving (also referred to as needle felting). The sorbent fibers are placed on a fine mesh screen (sometimes referred to as a scrim). A plurality of barbed needles are "punched" into the mass, so that the needles penetrate the fine mesh screen. As the needles are punched into the mass, and then withdrawn, some of the fibers are caught by the needles, and drawn through the mesh screen, binding the mass of fibers to the screen at a plurality of locations, both compressing the mass of fibers and securely affixing the mass of fibers to the mesh screen. The resulting needle punched mat can be cut to a desired size or shape, and employed as the filter media in an air filter.

Significantly, non-woven mats made from prior art recycled synthetic fibers have been unsuitable for use in air filters, due to the relatively high pressure drops associated with non-woven textiles formed out of such recycled synthetic fibers. Many of the prior art recycled synthetic fibers have been bound together using binders or adhesives to provide mechanical strength, and do not work well as sorbents, because the binders/adhesives reduces the sorbency of the mat. Note that using a very tight mesh to contain recycled synthetic fibers in a filter frame does not work well, because when the mesh is sufficiently tight (i.e., with small openings) to provide the necessary mechanical strength, the mesh reduces flow rates to unacceptable levels (flow rate reductions increase energy costs, since more energy needs to be expended to force a fluid through the filter).

If desired, the PET derived polyester fiber media included in the air filters disclosed herein can be treated with at least one of a herbicide, a bactericide, a fungicide, an antimicrobial agent, a deodorizer (such as activated carbon, or other materials, to remove odors), and a fragrance (to introduce a pleasant scent into the filtered air). Furthermore, the PET derived polyester fiber filter media can also be treated with an electrostatic charge to temporarily increase its MERV value.

Other exemplary aspects of the concepts disclosed herein are as follows. The non-woven textile produced from the PET derived polyester fiber is, in at least some exemplary embodiments, both air and water permeable. In at least some exemplary embodiments, the non-woven textile produced from the PET derived polyester fiber need not be combined with any other fabric or textile for use as a filter media (except for the support element discussed above, which is generally not implemented as a textile or fabric). In at least some exemplary embodiments, the non-woven textile produced from the PET derived polyester fiber includes no binders or adhesives, which could increase the air resistance of the filter media, as well as reducing the sorbency of the filter media. In at least some exemplary embodiments, the PET derived polyester fibers, nor any other fibers used in the non-woven textile filter media, are coated with any material to enhance the fibers effectiveness as a sorbent. In at least some exemplary embodiments, the non-woven textile produced from the PET derived polyester fiber is homogeneous, such that any mixture of different fiber types, fiber diameters, and/or fiber lengths are relatively evenly distributed throughout the non-woven textile. In at least some exemplary embodiments, the non-woven textile produced from the PET derived polyester fiber is not thermally bonded together to produce the non-woven textile, as such thermal bonding can undesirably change the interstitial spaces in the network of fibers that develops during needle punching.

FIGS. 8A and 8B schematically illustrate air filters where support structure 86 exhibits a different configuration than that shown in FIG. 1. The support structures of FIGS. 8A and 8B can be formed of metal, plastic or cardboard. In at least one embodiment, such support structures are formed of recycled materials. If desired, the support structures of FIGS. 8A and 8B can be formed integral to the frame 82.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for filtering air, comprising the steps of:
   (a) providing an air filter; and
   (b) introducing the air filter into an air flow, such that the air filter filters the air,
   wherein the air filter comprises:
   (a) a frame; and
   (b) a non-woven textile filter media disposed in the frame, the nonwoven textile filter media comprising a needle-punched wadded mass comprising longer fibers and shorter fibers, wherein the shorter fibers range from 5 to 55 mm in length and make up a substantial majority of the wadded mass and the longer fibers range from 60 to 100 mm in length and make up a minority of the wadded mass, the longer fibers and shorter fibers being polyester fibers,
   wherein the polyester fibers comprise a combination of about 1.5 denier fibers and about 4 denier fibers,
   wherein a ratio of 1.5 to 4 denier fibers is between 1:1 to 1:4, and
   wherein the non-woven textile filter media exhibits a Minimum Efficiency Reporting Value (MERV) of about 8 without requiring electrostatic treatment, and a pressure drop of 2.9 PSI or less.

2. The method of claim 1, wherein the polyester fibers are produced from recycled PET beverage bottles without delustering the polyester fibers so produced.

3. The method of claim 1, wherein:
   the non-woven textile filter media has sufficient mechanical strength to withstand a flow of air through the non-woven textile filter media without the flow of air disrupting the integrity of the non-woven textile filter media, wherein the flow of air is at least about 1968 CFM.

4. The method of claim 1, wherein the air filter consists entirely of recycled materials.

5. An air filter for filtering air, comprising:
   (a) a frame; and
   (b) a non-woven textile filter media disposed in the frame, the nonwoven textile filter media comprising a needle-punched wadded mass comprising longer fibers and shorter fibers, wherein the shorter fibers range from 5 to 55 mm in length and make up a substantial majority of the wadded mass and the longer fibers range from 60 to 100 mm in length and make up a minority of the wadded mass, the longer fibers and shorter fibers being polyester fibers,
   wherein the polyester fibers comprise a combination of about 1.5 denier fibers and about 4 denier fibers,
   wherein a ratio of 1.5 to 4 denier fibers is between 1:1 to 1:4, and wherein the non-woven textile filter media exhibits a Minimum Efficiency Reporting Value (MERV) of about 8 without requiring electrostatic treatment, and a pressure drop of 2.9 PSI or less.

6. The air filter of claim 5, further comprising a support structure coupled to the frame to support the non-woven textile filter media.

7. The air filter of claim 6, wherein the frame and support structure are made from recycled materials, such that the air filter consists entirely of recycled materials.

8. The air filter of claim 5, wherein said non-woven textile filter media has a thickness ranging from about 0.5 cm to about 2.5 cm.

9. The air filter of claim 5, wherein said non-woven textile filter media weighs less than about 0.15 to about 0.35 ounce per square foot and has a thickness of about 0.5 cm to about 2.5 cm.

10. The air filter of claim 5, wherein the non-woven textile filter media has sufficient mechanical strength to withstand a flow of air through the non-woven textile filter media without the flow of air disrupting the integrity of the non-woven textile filter media, where the flow of air is at least about 1968 CFM.

11. The air filter of claim 5, wherein the polyester fiber is derived from recycled green colored polyethylene terephthalate bottles, such that the non-woven textile filter media is green in color.

12. The air filter of claim 5, wherein the non-woven textile filter media is made by combining less than about 10% of recycled synthetic fibers from non polyethylene terephthalate sources with the polyester fiber.

13. The air filter of claim 5, wherein said non-woven textile filter media weighs less than about 0.15 to about 0.35 ounce per square foot.

14. The air filter of claim 5, wherein the polyester fiber is produced without applying any delustering to the polyester fiber so produced.

15. A method for making a non-woven textile filter media for filtering air, the method comprising the steps of:
 (a) providing a quantity of bulk polyester;
 (b) generating a quantity of polyester fiber having a predefined diameter from the quantity of bulk polyester;
 (c) cutting the polyester fiber to a predefined length;
 (d) using the polyester fiber having the predefined length to generate the non-woven textile filter media,
 (e) needle punching the polyester fiber to form a wadded mass comprising longer fibers and shorter fibers, wherein the shorter fibers range from 5 to 55 mm in length and make up a substantial majority of the wadded mass and the longer fibers range from 60 to 100 mm in length and make up a minority of the wadded mass, the longer fibers and shorter fibers being polyester fibers,
 wherein the polyester fibers comprise a combination of about 1.5 denier fibers and about 4 denier fibers,
 wherein a ratio of 1.5 to 4 denier fibers is between 1:1 to 1:4, and
 wherein the non-woven textile filter media exhibits a Minimum Efficiency Reporting Value (MERV) of about 8 without requiring electrostatic treatment, and a pressure drop of 2.9 PSI or less.

16. The method of claim 15, wherein the non-woven textile filter media that weighs less than about 0.15 to about 0.35 ounce per square foot and has a thickness of about 0.5 cm to about 2.5 cm.

\* \* \* \* \*